(12) United States Patent
De Vries

(10) Patent No.: US 7,267,389 B2
(45) Date of Patent: Sep. 11, 2007

(54) PICKUP TRUCK BED COVER

(76) Inventor: Hermanus A. De Vries, 62 Blackwood Street, 24 Kingfisher Creek, Clubview, Centurion 0157 (ZA)

(*) Notice: Subject to any disclaimer, the term of this patent is extended or adjusted under 35 U.S.C. 154(b) by 0 days.

(21) Appl. No.: 10/540,338

(22) PCT Filed: Dec. 18, 2003

(86) PCT No.: PCT/IB03/06060

§ 371 (c)(1),
(2), (4) Date: Nov. 18, 2005

(87) PCT Pub. No.: WO2004/054833

PCT Pub. Date: Jul. 1, 2004

(65) Prior Publication Data

US 2006/0103164 A1 May 18, 2006

(30) Foreign Application Priority Data

Dec. 18, 2002 (ZA) .............................. 2002/10217

(51) Int. Cl.
*B60P 7/02* (2006.01)

(52) U.S. Cl. .................................................. 296/100.09
(58) Field of Classification Search ........... 296/100.09, 296/100.06, 100.07, 100.1
See application file for complete search history.

(56) References Cited

U.S. PATENT DOCUMENTS

| 3,202,455 A | * | 8/1965 | Grotz ..................... 296/100.08 |
| 6,086,134 A | | 7/2000 | Cravens et al. |
| 6,217,102 B1 | * | 4/2001 | Lathers ................... 296/100.07 |
| 2003/0057725 A1 | * | 3/2003 | Hernandez et al. .... 296/100.09 |

* cited by examiner

*Primary Examiner*—Joseph D. Pape
(74) *Attorney, Agent, or Firm*—Darby & Darby

(57) ABSTRACT

The invention comprises a vehicle load bin cover (1) that includes front (2) and rear (3) sections hinged together along contiguous edges and the front section other edge hingeable to a vehicle load bin, characterized in that the rear section (3) carries a support (14) pivoted at one end thereto with the other end pivotably mountable to the load bin to enable the cover (1) to be raised and lowered with the rear section (3) maintained in a substantially constant relation to the loadbin.

12 Claims, 10 Drawing Sheets

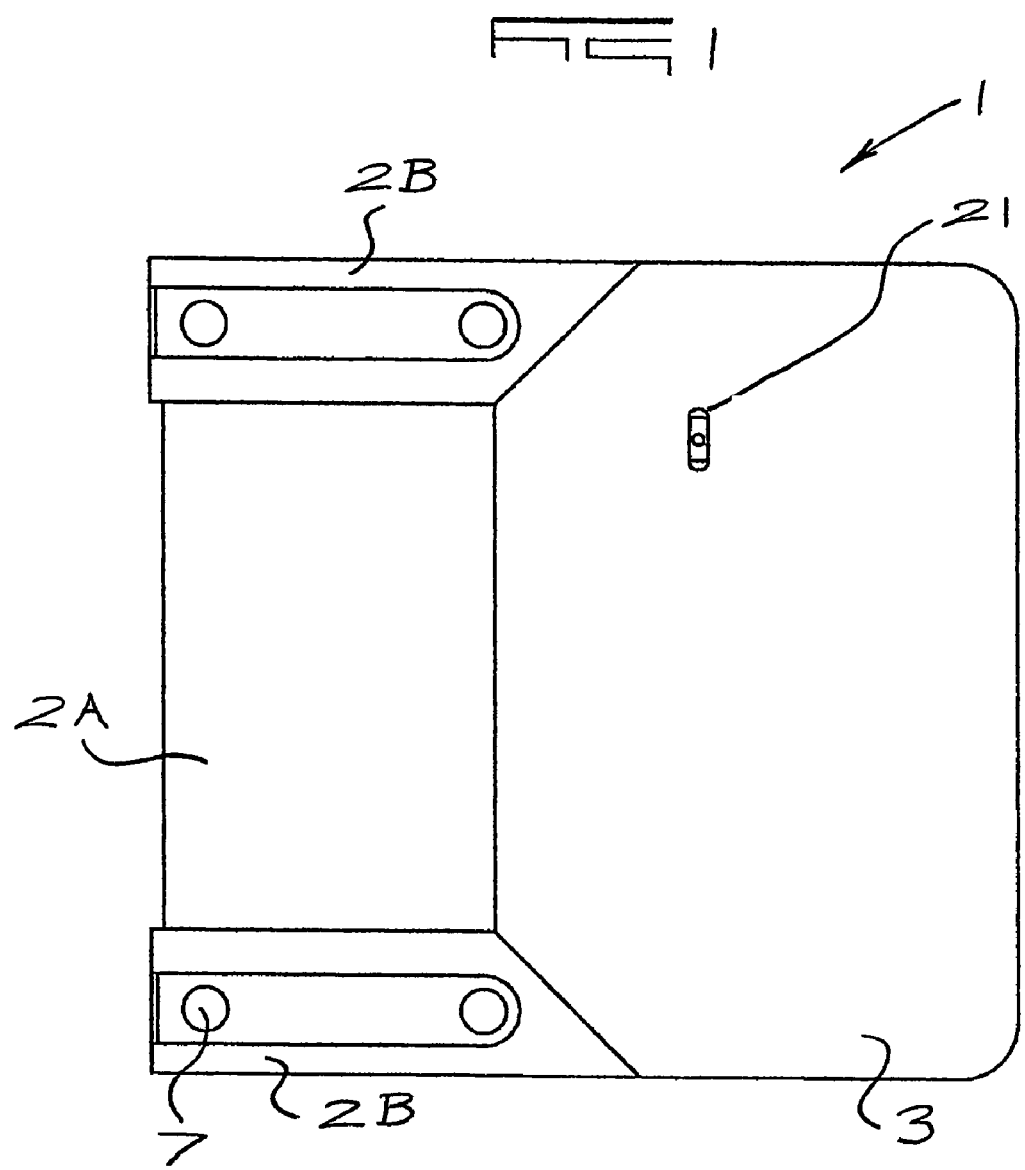

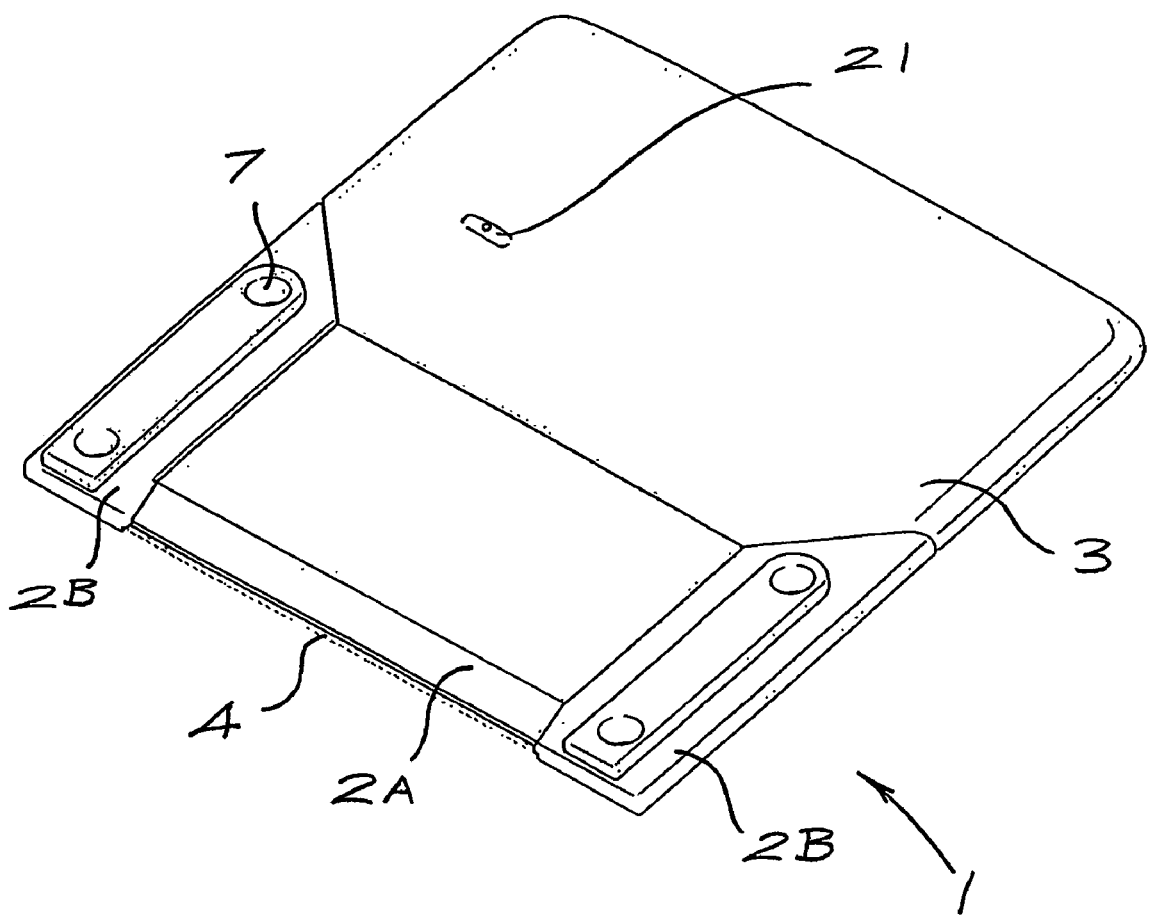

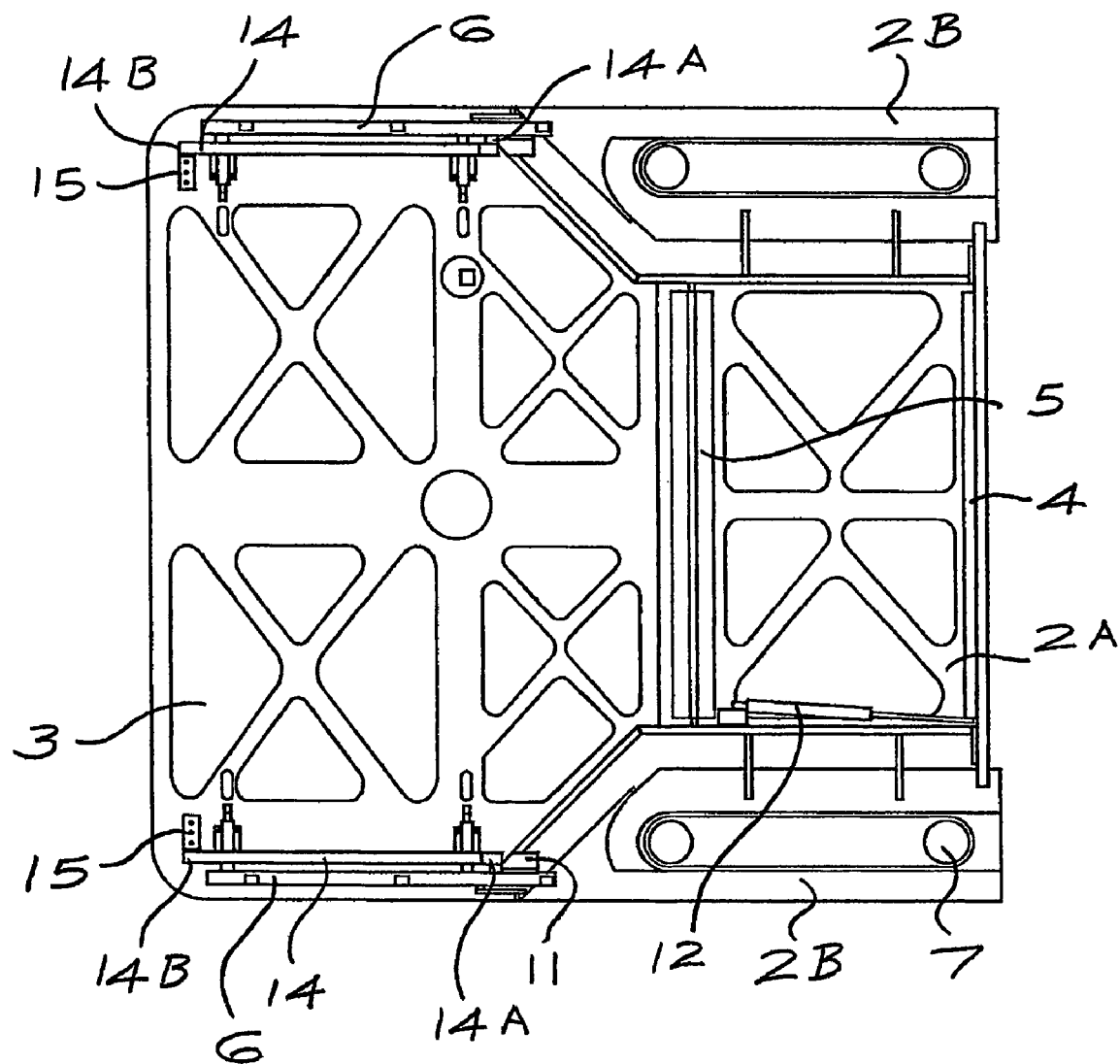

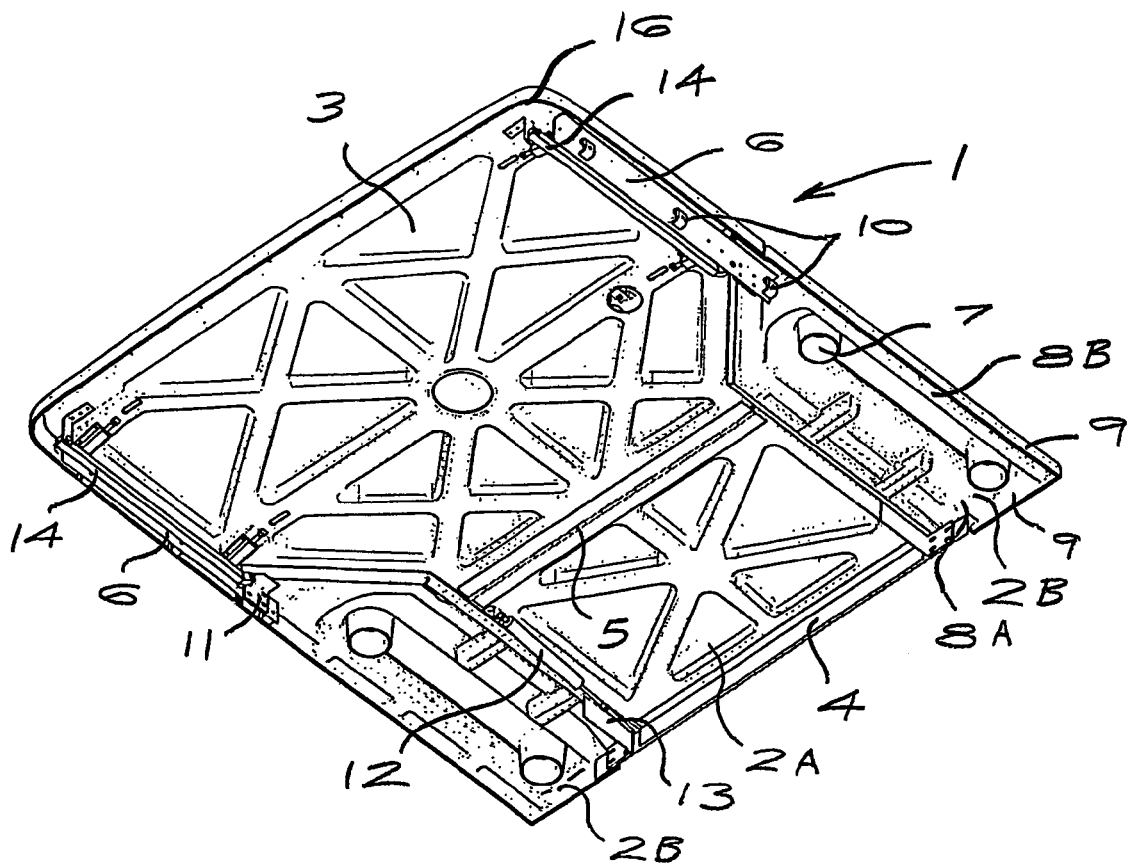

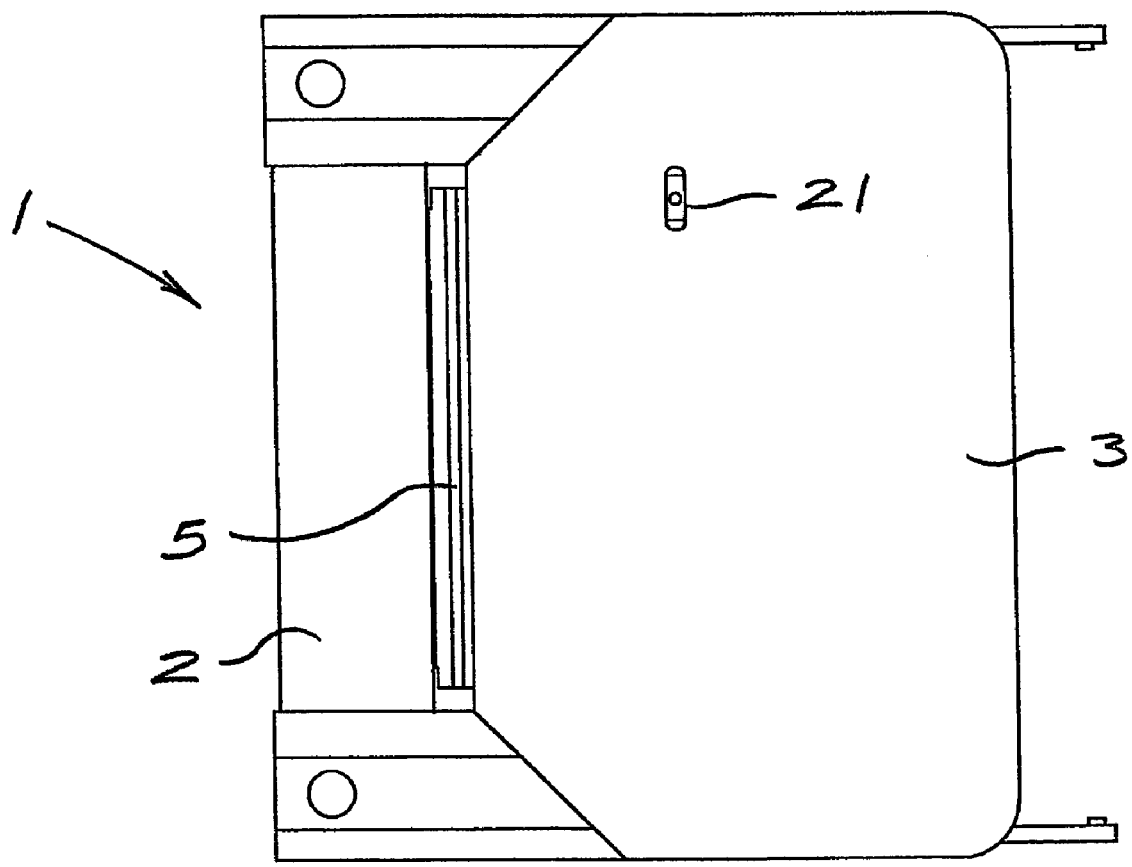

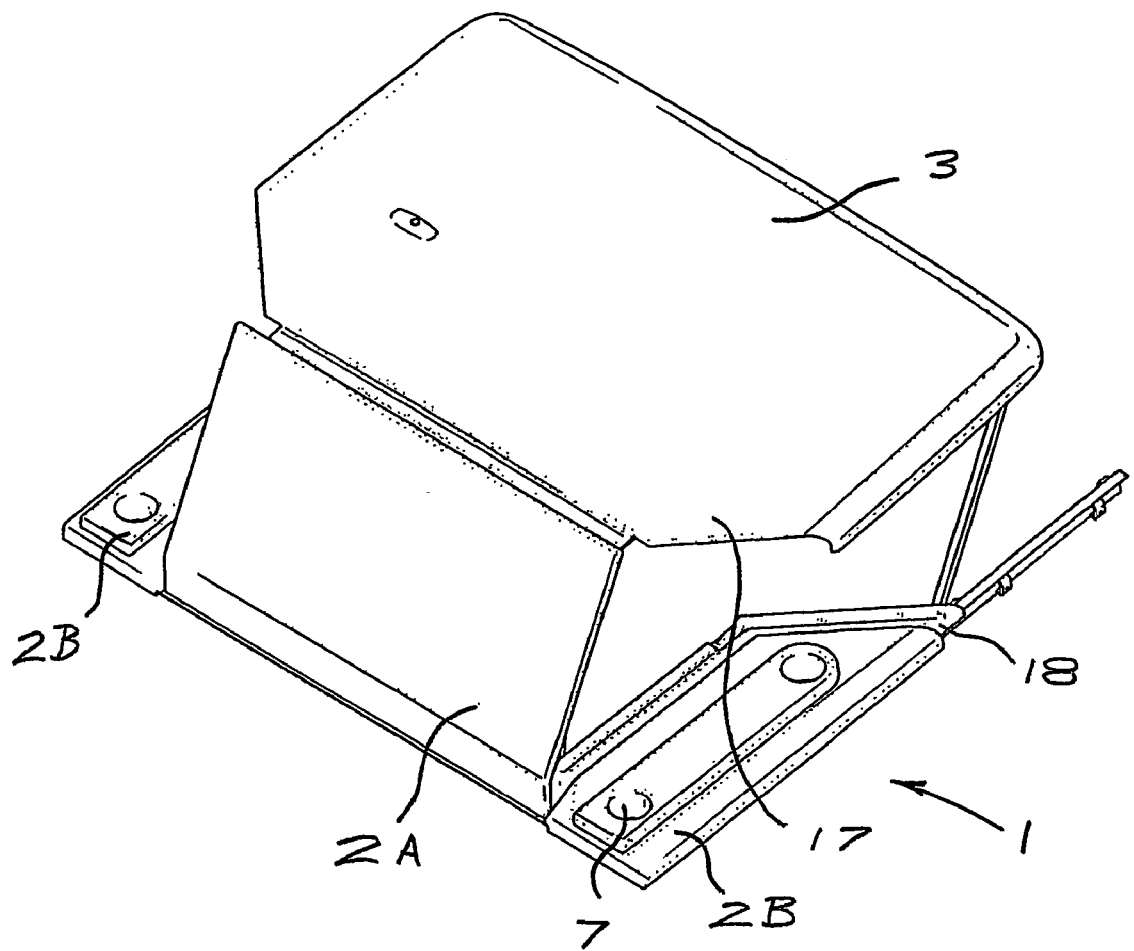

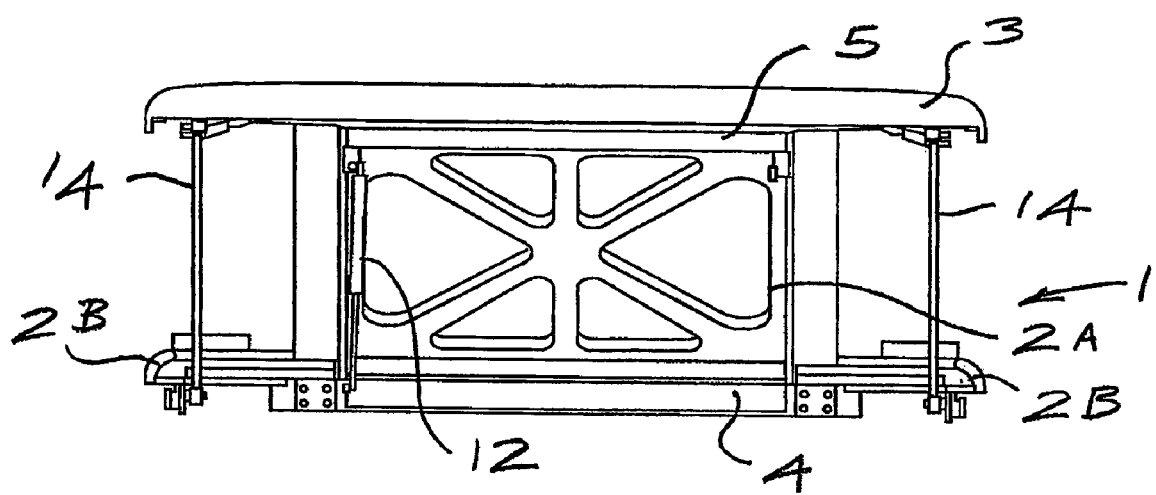

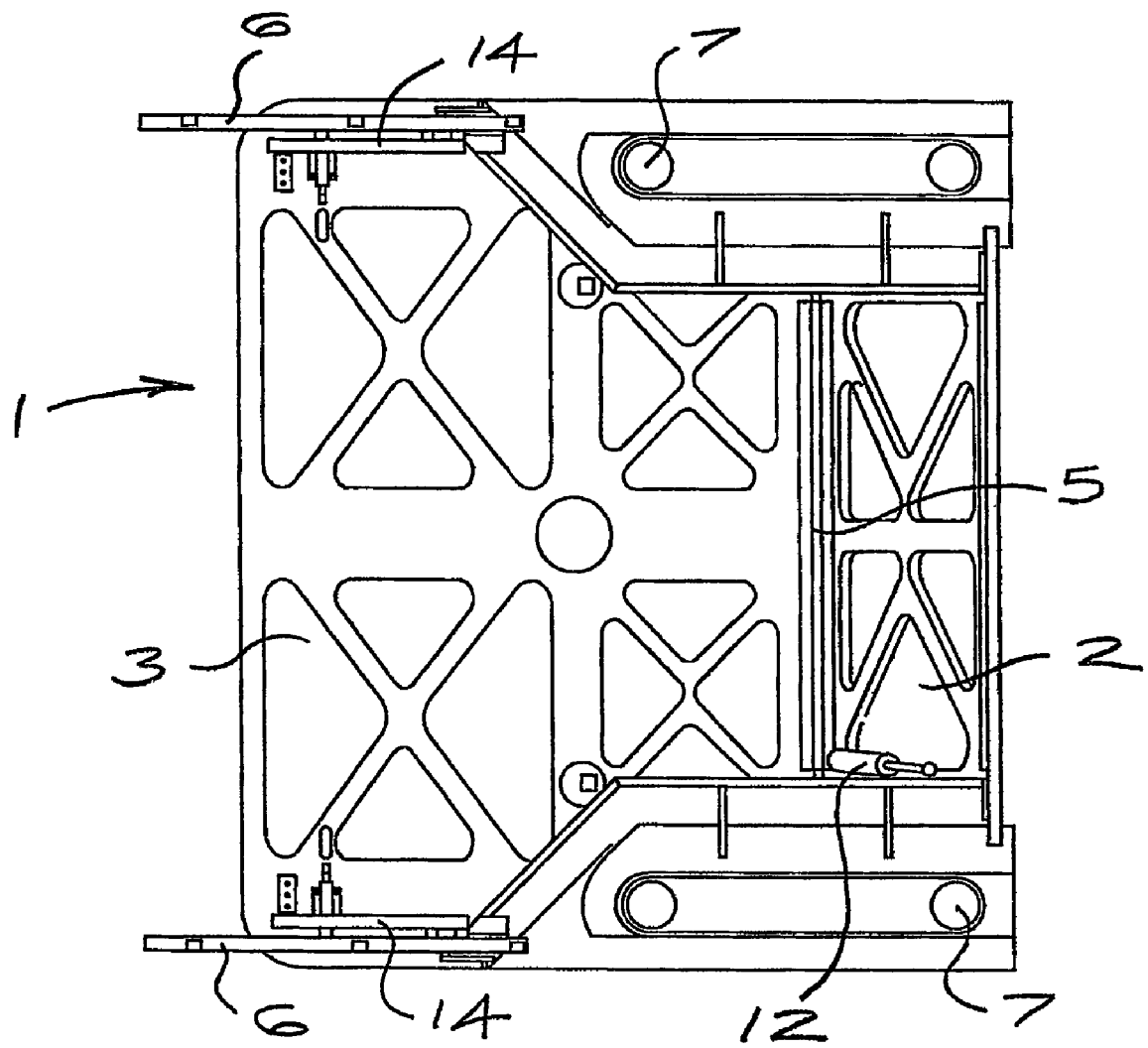

PICKUP TRUCK BED COVER

FIELD OF THE INVENTION

This invention relates to a cover for loadbins of pickup trucks, trailers and the like.

BACKGROUND TO THE INVENTION

Many vehicles such as pickup trucks and trailers have loadbins. Numerous attempts have been made to utilise these loadbins in more ways than possible with a standard loadbin.

Some pickup trucks are fitted with flexible covers, typically made from canvas or a flexible waterproof material that are stretched over the loadbin to protect items stored in the loadbins from elements such as water and dust, and to minimise the risk of theft of the items.

Problems with these covers include that it is difficult to ensure adequate waterproofing of the loadbin and that there is still a risk of theft from the loadbin since these canvas covers are easily opened.

Some pickup trucks are also fitted with canopies, typically in a hard shell configuration that match the vehicle design, but also sometimes in a canvas canopy configuration that comprises a frame that is secured to the loadbin with canvas stretched over it.

Problems with these covers include relatively high cost, difficulty in removal once it is fitted, and alteration of the vehicle's appearance.

Some trailers are also fitted with loadbin covers as a semi-permanent fixture. Such a cover may be secured by means of a hinge to a side edge of the loadbin upper rim, as is typically the case with trailers.

Another development has been a rigid cover that lies flush with the loadbin upper rim, and which is secured by means of a hinge along the front of the loadbin rim. On pickup trucks this hinge is located to the rear of the cab of the truck.

A problem with these covers is that the cover has to be opened completely to gain access to contents of the loadbin, which may expose the contents to rain damage. It is also possible that such a cover may be damaged by high wind when it is in the open position. It is normally not possible to drive with the cover in the open position.

OBJECT OF THE INVENTION

It is an object of this invention to provide a loadbin cover that at least partly alleviates the above-mentioned problems.

SUMMARY OF THE INVENTION

In accordance with this invention there is provided a vehicle load bin cover comprising front and rear sections hinged together along contiguous edges and the front section other edge hingeable to a vehicle load bin, characterised in that the rear section carries a support pivoted at one end thereto with the other end pivotably mountable to the load bin to enable the cover to be raised and lowered with the rear section maintained in a substantially constant relation to the loadbin.

There is further provided for the cover to be configured such that the rear section can be maintained substantially parallel to the top of the vehicle loadbin.

There is still further provided for the cover to include at least one rigid support rotatably secured between the rear section and the loadbin, preferably between the rear section and the loadbin rim, further preferably to a bracket securable to the loadbin rim.

There is also provided for the cover to include at last one collapsible support between the front section and the loadbin, preferably between the front section and the loadbin rim.

There is still further provided for the collapsible strut to be configured to provide sufficient support to prevent unintentional movement of the cover.

There is still further provided for the cover to include at least one rail securable to the load bin to stabilize the assembly, for the rail to include a set of clips slidably securable over the loadbin rim.

There is still further provided for the cover to include at least one seal that operatively seals against the loadbin rim.

There is still further provided for the front section to include fixed side panels to accommodate bars extending from the loadbin.

There is also provided for the cover to include lock barrels on the rear section, the lock barrels operable by means of a key operated lock secured to the cover.

A further feature of the invention provides for the cover to include side covers secured to the rear section, the side covers being extendable from the rear section to the loadbin rim and being securable to the loadbin rim, and further for the side covers to preferably comprise flexible material covers, preferably canvas covers.

BRIEF DESCRIPTION OF THE DRAWINGS

A preferred embodiment of a loadbin cover according to the invention is described below by way of example only and with reference to the following drawings in which:

FIG. 1 is a plan view of the top a loadbin cover in the closed position;

FIG. 2 is a perspective view of the cover as shown in FIG. 1;

FIG. 3 is a plan view of the bottom of the loadbin cover of FIG. 1;

FIG. 4 is a perspective view of the cover as shown in FIG. 3;

FIG. 5 is a plan view of the top of the cover of FIG. 1 in the open position;

FIG. 6 is a perspective view of the cover as shown in FIG. 5;

FIG. 9 is a rear end view of the cover as shown FIG. 5;

FIG. 10 is a plan view of the bottom of the cover of FIG. 1 in the open position.

DETAILED DESCRIPTION OF THE INVENTION

Figure 8:
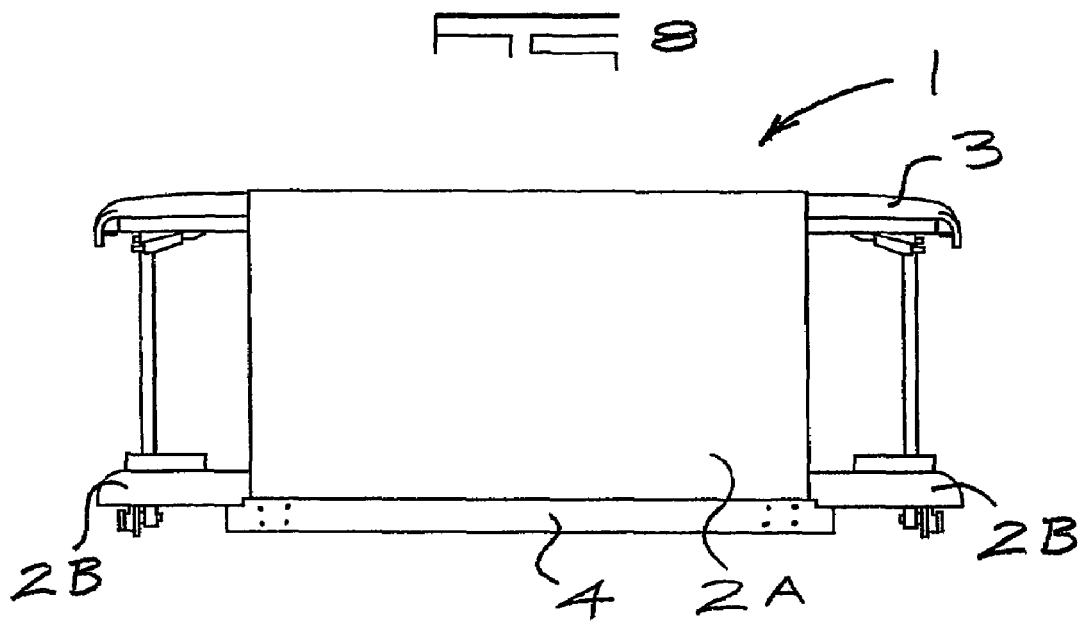
FIG. 8 is front end view of the cover as shown in FIG. 5.

The drawings show a preferred embodiment of a loadbin cover (1) according to the invention. The cover (1) comprises a front (2) and a rear (3) section. The front section (2) is rotatably securable to a vehicle loadbin (not shown) by means of loadbin hinge (4). The front (2) and rear (3) sections are rotatably secured to each other by means of a cover hinge (5), which are arranged substantially parallel to each other.

Figure 7:
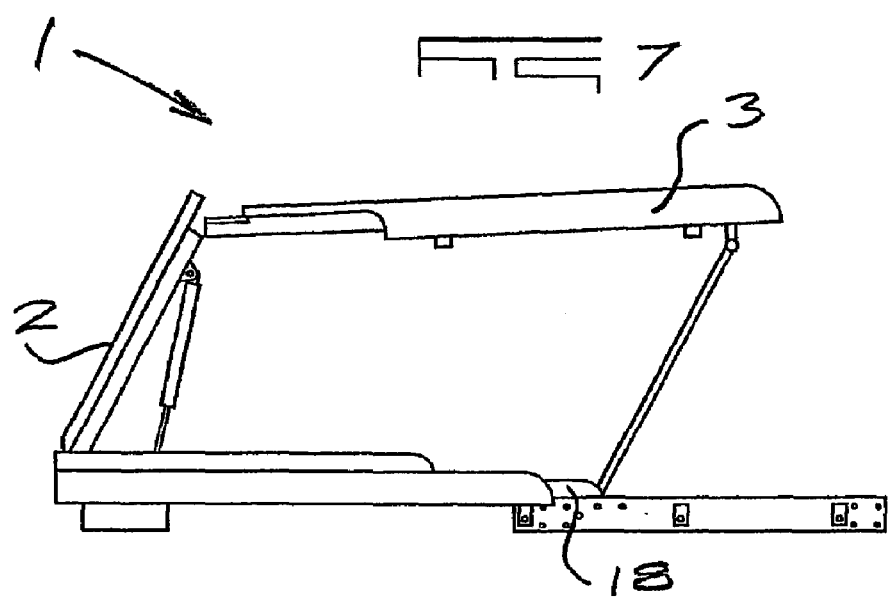
FIG. 7 is an elevation of the cover as shown in FIG. 5.
Figure 11:
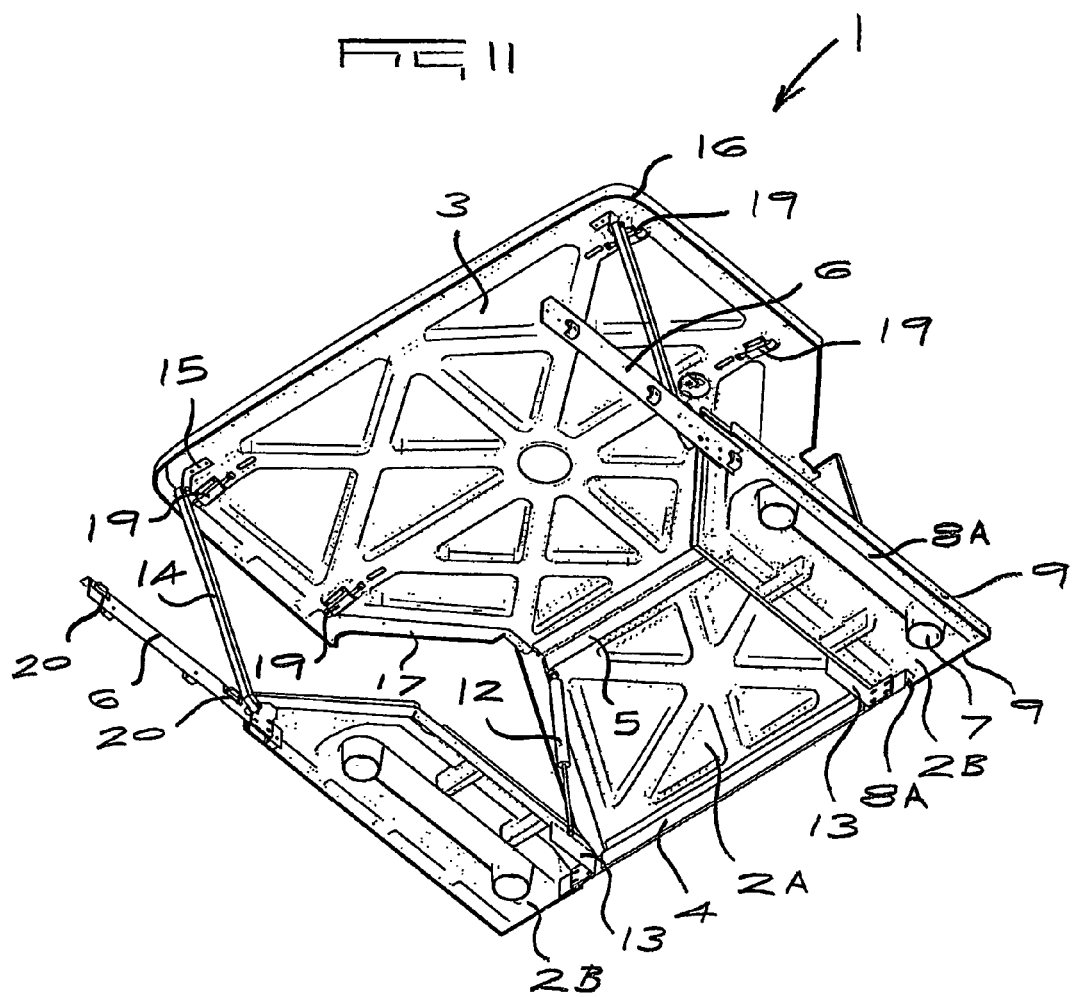
FIG. 11 is a perspective view of the cover as shown in FIG. 10.

The cover (1) is operable to be moved between a closed position, as shown in FIGS. 1 to 4, and an open position as shown in FIGS. 5 to 11, through rotation of the front section (2) around the loadbin hinge (4) and rotation of the rear section around the cover hinge (5).

In this embodiment the cover is shaped to fit to a pickup truck loadbin. The pickup truck loadbin is fitted with a roll bar that extends upwards from the loadbin floor. The cover (1) is shaped to accommodate the roll bar by means of a split front section (2). The front section (2) includes a central portion (2*a*) which is rotatably secured to the loadbin by means of the loadbin hinge (4), and roll bar sections (2*b*) which are semi-permanently securable to the loadbin by attachment to securing rails (6) and through a tight press fit over the loadbin rim. The roll bar sections (2*b*) include circular apertures (7) shaped for the roll bar to pass through and are provided with seals to prevent water from penetrating into the loadbin between the roll bar and the roll bar aperture (7).

The roll bar sections (2*b*) are shaped such that the distance between the roll bar aperture (7) and the edges (8*a*, 8*b*) of the roll bar section (6) ensures a press fit of the roll bar section (2*b*) over the loadbin rim. To ensure water proofing of this section the roll bar section forms a lip (9) that extends over the loadbin rim and the lip is also provided with a seal.

The securing rails (6) are removably secured to the loadbin rim by means of clips (10) that fit over the lip of the loadbin rim by means of a press fit. The loadbin rim forms a lip that is orientated downwards, which allows the clips (10) to engage the lip through an upward press fit. With the rail (6) in place a bracket (11) is bolted to the rail (6) which secures the relevant side section (2*b*) to the rail (6).

As mentioned, the cover (1) is rotatably secured to the loadbin by means of the loadbin hinge (4). The cover (1) also includes supports to keep it open when in the open position. The supports include an extendable support or gas-strut (12) that is rotatably secured the front section (2*a*) and to a bracket (13) that is secured at the end of the loadbin hinge (4). The supports also include two fixed length supports (14), each of which is rotatably secured at one end (14*a*) to bracket (11) that is bolted to the rail (6), and at its other end (14*b*) to a bracket (15) that are secured to the rear section (3) of the cover (1).

The rear section (3) is also shaped to form a waterproof seal with the loadbin by means of a lip (16) that extends over the loadbin rim and which incorporates a seal. In addition, the rear section is formed with an overlap (17) over the roll bar sections (2*b*). The portion of each roll bar section (2*b*) that is overlapped includes a channel (18) which are shaped to guide water towards the side of the cover and away from the loadbin. In addition the overlap (17) is provided with two seals that seal against the roll bar section on both sides of the channel (18).

The cover also includes a lock, which comprises four barrels (19) that are arranged to engage four complimentarily located lips (20) on the rail (6). The locks are operable by means of a key operated lock mechanism (21) in the rear section (3) of the cover (1). The lock mechanism (21) is connected to the barrels (19) by means of a set of cables that are located in channels (not shown) in the rear section (3).

The cover (1) is manufactured from a durable moulded plastics material, and provided with a finish that compliments the appearance of the vehicle's finishing.

To open the cover the lock is unlocked with the key operated lock mechanism (21). The cover (1) is then lifted from the loadbin which allows simultaneous rotation of the front section around the loadbin hinge (4) and rotation of the rear section (3) around the cover hinge (5). The front section (2*a*) is raised until it is in an almost upright position, as shown in FIGS. 5 to 11, most noticeable in FIG. 7. In this position the gas strut (12) is fully extended and supports the front section (2*a*). The rear section is supported by the two fixed length supports (14), which rotate at its respective connection points (14*a*, 14*b*) to follow the movement of the rear section (3).

With the cover (1) in the open position there is easy access to the contents of the loadbin, even items that may be stored towards the front of the loadbin. The parallel orientation of the rear section relative to the loadbin rim also ensures that the loadbin contents will at least partly be protected from sun or rain when the cover (1) is in the open position.

The front section (2*a*) of the cover (1) has a length that is just less than the height of the cab of the vehicle. This ensures that the cover does not extend above the cab when in the open position, making it possible to drive with the cover opened. The gas strut (12) is also stiff enough to ensure that the cover remains open even when driving.

To close the cover (1) again, the rear section (3) is simply pressed down, which will force the gas strut to retract and allow the cover to be closed. The cover will automatically be secured in position upon closing by means of the spring loaded barrels (19) that will automatically engage the lips (20) upon closure of the cover (1). Once closed the cover may be locked by means of the key.

The invention therefore provides a durable, secure, and waterproof loadbin cover that also compliments the appearance of the vehicle. The cover allows for easy access to items stored in the loadbin and also allows for driving with the cover in the open position.

It will be appreciated that this is not the only embodiment of a cover according to the invention. It is for instance possible to use the cover with vehicles other than the one described above, such as pickup truck without a roll bar, or a trailer. For these vehicles the front section may be formed from as a single unit, with the loadbin hinge extending to the full width of the loadbin.

It is also possible, and envisaged, for the cover to be used to transform the loadbin into a camping facility. This may be done by securing side covers to the rear section, which may extend from the rear section to the loadbin rim when the cover is in the open position. The side covers will typically comprise canvas covers that will be stowed in rolled-up fashion along the edges of the rear section of the cover. The canvas covers may then be rolled down once the cover is opened, and may be secured to the loadbin by means of clips. This will provide a versatile tent over the loadbin. The loadbin may still be used for normal transport of items with this configuration.

It is further possible to connect the lock to the locking mechanism of the vehicle, specifically the central locking system of the vehicle to make operation of the cover even easier.

The invention claimed is:

1. A vehicle load bin cover comprising:
   front and rear sections hinged together along contiguous edges, wherein the front section has one edge hingeable to a vehicle load bin;
   a collapsible support having a first end rotatably secured to said front section and a second end to be secured proximate to the operative front of the load bin;
   a rigid support having a first end rotatably secured to said rear section and a second end to a bracket securable to the load bin rim proximate the operative rear thereof, wherein the rotation point of said second end of the rigid support to said bracket is lower in relation to the load bin than the rotation point of the second end of said collapsible support above the load bin pivotably mounted to the load bin to enable the cover to be raised and lowered with the rear section maintained in a substantially constant relation to the load bin and to provide a mechanical advantage for opening the cover.

2. A cover as claimed in claim 1 wherein the rear section can be maintained substantially parallel to the top of the vehicle load bin.

3. A cover as claimed in claim 1 in which the collapsible support is configured to provide sufficient support to prevent unintentional movement of the cover.

4. A cover as claimed in claim 1 and further comprising:
at least one rail securable to the load bin to stabilize the rail, the rail including a set of clips slidably securable over the load bin rim.

5. A cover as claimed in claim 1 and further comprising:
at least one seal that operatively seals against the load bin rim.

6. A vehicle load bin cover comprising:
front and rear sections hinged together alone contiguous edges, wherein:
the front section has one edge hingeable to a vehicle load bin, and
the rear section carries a support pivoted at one end thereto with the other end pivotably mountable to the load bin to enable the cover to be raised and lowered with the rear section maintained in a substantially constant relation to the load bin, and
wherein bars extend from the load bin and further comprising:
fixed side panels as part of the cover to attach to said bars.

7. A cover as claimed in claim 1 and further comprising:
lock barrels on the rear section operable by means of a key operated lock secured to the cover.

8. A cover as claimed in claim 1 wherein the cover further comprises side covers secured to the rear section, the side covers are extendable from the rear section to the load bin rim and are securable to the load bin rim.

9. A vehicle load bin cover comprising:
front and rear sections hinged together alone contiguous edges, wherein:
the front section has one edge hingeable to a vehicle load bin, and
the rear section carries a support pivoted at one end thereto with the other end pivotably mountable to the load bin to enable the cover to be raised and lowered with the rear section maintained in a substantially constant relation to the load bin,
wherein the cover further comprises side covers secured to the rear section, the side covers are extendible from the rear section to the load bin rim and are securable to the load bin rim, and
wherein the side covers comprise flexible material covers.

10. A cover as claimed in claim 9 wherein the side covers comprise canvas covers.

11. A bin cover as claimed in claim 1 wherein said front has side portions to be fixedly mounted to the load bin sides and a central portion whose first side edge is to be hingeably mounted to the front of the load bin.

12. A cover as claimed in claim 11 wherein said front and rear sections are of rigid material.

* * * * *